April 25, 1967 J. H. WILSON 3,315,822
DRILL STEM AND PIPE POSITIONER DEVICE
Filed Oct. 4, 1965 10 Sheets-Sheet 7

JOHN HART WILSON
INVENTOR.

BY
Wayland D. Keith
HIS AGENT

April 25, 1967     J. H. WILSON     3,315,822
DRILL STEM AND PIPE POSITIONER DEVICE Filed Oct. 4, 1965     10 Sheets-Sheet 8

JOHN HART WILSON
INVENTOR.

BY
Wayland D. Keith
HIS AGENT

JOHN HART WILSON
INVENTOR.

BY
Wayland D. Keith
HIS AGENT

United States Patent Office 3,315,822
Patented Apr. 25, 1967

3,315,822
DRILL STEM AND PIPE POSITIONER DEVICE
John Hart Wilson, c/o Wilson Manufacturing Co.,
P.O. Box 1031, Wichita Falls, Tex. 76307
Filed Oct. 4, 1965, Ser. No. 492,581
10 Claims. (Cl. 214—2.5)

This invention relates to a pipe and drill stem positioner for receiving pipe and drill stem transversely thereonto from either side thereof, and positioning the pipe or drill stem longitudinally in such manner that it may be efficiently and expeditiously handled by a pipe handling device, such as pickup elevators or the like, such as used with drilling rigs, and more particularly semi-automated drilling rigs such as disclosed in my co-pending application, Ser. No. 420,293, filed Dec. 22, 1964.

The present invention is so constructed that it may be secured to a trailer which is constructed for hauling pipe and for dispensing pipe thereonto and therefrom, such as shown in my co-pending application, Pipe Hauling and Dispensing Apparatus, filed on this date, and which efficiently operates in conjunction therewith.

The present pipe positioning device comprises a longitudinal frame which is of greater length than the length of the pipe or drill stem being handled, which device has mechanism for moving the drill stem or pipe transversely of the longitudinal frame onto wheeled carriers, which wheeled carriers are positioned on a longitudinal trackway which is mounted centrally of the longitudinal frame. The mechanism is also capable of moving drill stem or pipe, which is positioned on the wheeled carriers, transversely of the longitudinal frame, onto a pipe rack or the like on either side of the pipe positioning device.

The present longitudinal frame has a plurality of longitudinally positioned, horizontal shafts journaled thereon, which shafts are operated through an arcuate movement by fluid actuated cylinders, levers and links, so as to perform the various functions of moving the pipe transversely onto or transversely off of the pipe positioner frame, and for moving the pipe onto carriers positioned on a trackway for movement longitudinally along the frame, either for removing pipe from a well and positioning it on a pipe rack or onto a pipe hauling and dispensing apparatus, or when going into the well drill stem or pipe, it permits the pipe to be selectively moved from the pipe rack, or pipe hauling and dispensing apparatus onto the pipe positioner, and then moved inward to be received by a pipe handling elevator of a rotary drilling rig or the like.

An object of this invention is to provide a mechanism for mechanically moving pipe transversely from a pipe rack or from a pipe hauling and dispensing apparatus onto the pipe positioner, then moving the pipe longitudinally to a predetermined point to enable the pipe or drill stem to be selectively engaged by a pipe handling elevator.

Still another object of the invention is to provide a pipe positioning device, which enables pipe or drill stem to be dispensed thereonto and then mechanically dispensed laterally therefrom onto a pipe receiving rack or onto a pipe hauling and dispensing apparatus until all pipe has been withdrawn from a well.

Still another object of the invention is to provide a pipe positioning device which is fluid actuated, and which may be selectively controlled from a remote position, to direct the pipe either onto a pipe hauling and dispensing apparatus or pipe rack, or, from the pipe rack or from the pipe hauling and dispensing apparatus onto the pipe positioning device.

Still another object of the invention is to provide a pipe positioning device which has longitudinally movable carrier thereon, the movement of which carrier is fluid actuated.

Another object of the invention is to provide a pipe positioning device which has a fluid actuated device thereon, which fluid actuated device will even the ends of the pipe uniformly, when removing the pipe from a pipe rack or pipe hauling and dispensing apparatus onto the pipe positioning device.

Still a further object of the invention is to provide a pipe positioning device which has a fluid actuated elevator thereunder to selectively raise an end of a length of pipe or drill stem, thereby to enable a pipe handling elevator to be attached thereto.

Still another object of the invention is to provide a pipe positioning device which is efficient and positive in operation, and which is easy to operate.

With these objects in view and other which will become manifest as the description proceeds, reference is to be had to the accompanying drawings in which like reference characters designate like parts in the several views thereof, in which.

With more detailed reference to the drawings, the numeral 1 designated generally an elongated structural frame which is adapted to be secured to the chassis 2 of a trailer designated generally by the numeral 4, by outwardly projecting sills 6.

The trailer 4 preferably has a pipe or drill stem hauling rack 8 thereon to provide a pipe hauling and dispensing apparatus as more fully set forth in the above referred to co-pending application. The rack 8 is raised and lowered relative to the chassis 2 by fluid actuated jacks 10. The fluid actuated jacks 10 may be selectively controlled to angulate the rack 8, so as to dispense pipe or drill stem 12 onto the elongated frame 1 of the pipe positioner, or the rack 8 may be so arranged as to receive pipe or drill stem from the pipe positioner, generally designated by the numeral 14, as is more fully brought out in my co-pending application, Pipe Hauling and Dispensing Apparatus, filed as of this date, the structure and operation thereof being fully set forth therein. The pipe positioner is capable of moving the pipe laterally relative to each side of the pipe positioning frame, as well as of moving the pipe longitudinally with respect thereto. With the rack 8 in an angulated position, as shown in FIG. 13, and with the upper faces of divider strips 16 located substantially level with the upper faces of outwardly extending supports 72 on frame 1, the pipe or drill stem will roll downward until the length of pipe or drill stem adjacent the pipe positioner 14 comes to rest against the outermost pipe kicker bars 20 or pipe kicker bars 22, depending upon which side of the pipe positioner 14 is receiving the pipe or drill stem from the rack 8.

Figure 8:
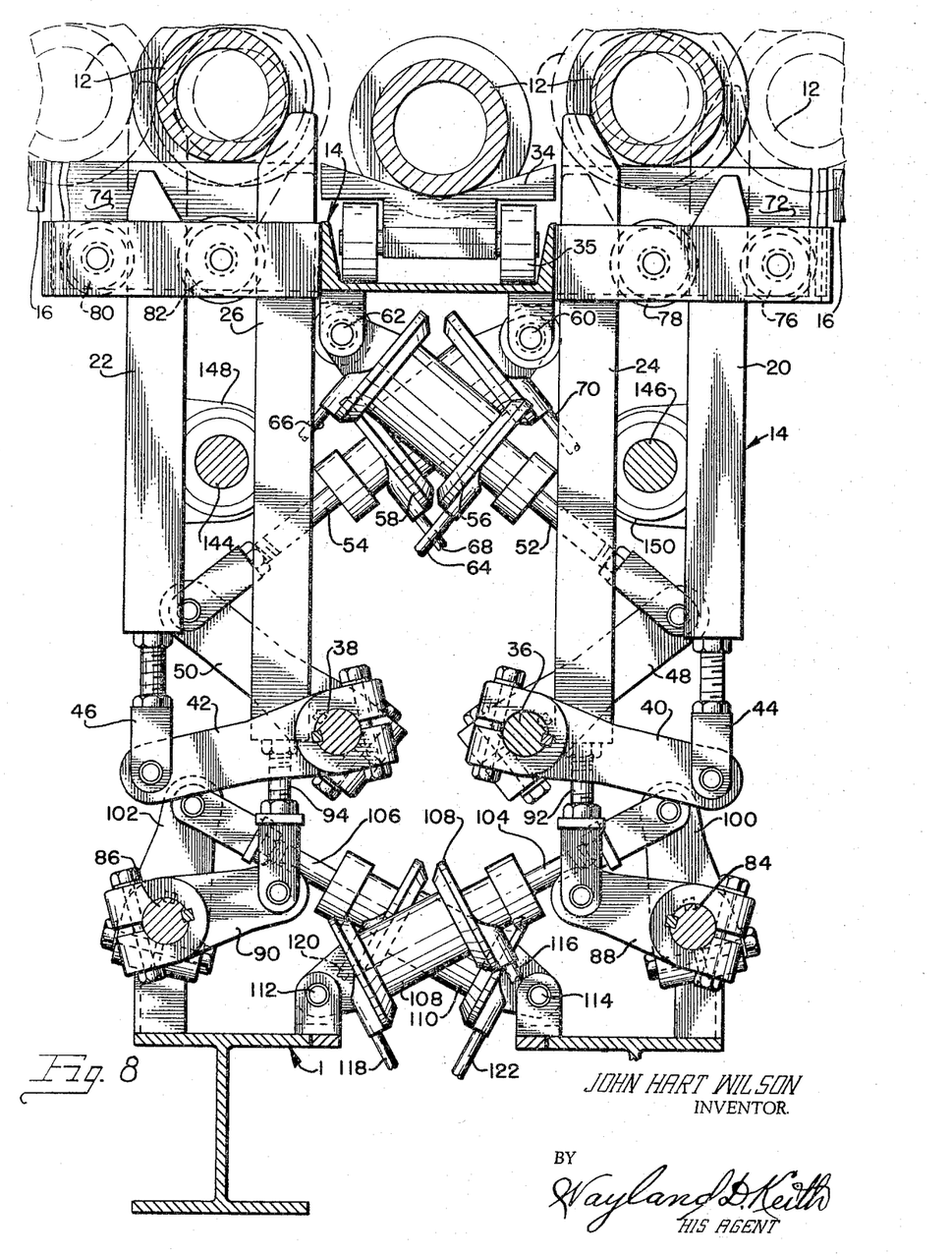
FIG. 8 is a sectional view taken on line 8—8 of FIG. 2 looking in the direction indicated by the arrows, and showing the pipe positioning "kicker" members thereon for moving the pipe transversely of the pipe positioning device, with certain portions being shown in full outline and certain portions being shown in dashed outline to show the relative relation between the various machanisms and the pipe.
Figure 13:
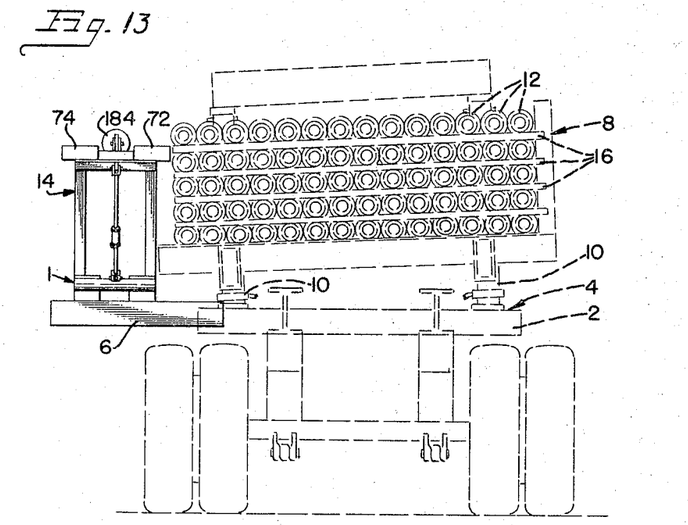
FIG. 13 is an end elevational view of the pipe positioning device shown in full outline mounted on a pipe hauling and dispensing apparatus, showing the trailer and the drill stem or pipe thereon in dashed outline, in position to dispense pipe or drill stem onto the pipe positioning device.

While only one pipe hauling and dispensing apparatus is shown in FIG. 13, from which to dispense pipe or drill stem onto the pipe positioner 14, it is to be understood that the pipe positioner is so designed and constructed as to receive pipe from either side thereof, as shown in FIG. 8, therefore, two such pipe hauling and dispensing apparatuses may be emloyed; however, when two such units are used, the pipe positioner 14 is secured to only one trailer chassis 2, as by bolting or welding, the sills 6, however, will abridge to the chassis of the other trailer.

The outermost kicker bars 20 and 22 comprise substantially vertically movable bars, each of which has opposed angulated faces near the upper end thereof. These outermost pipe kicker bars 20 on one side and the bars 22 on the other side serve to initially stop the drill stem or pipe 12, when the pipe is rolling onto the pipe positioner 14 from the pipe rack 8; however, these respective pipe kicker bars 20 and 22 work in conjunction with the intermediate pipe kicker bars 24 and 26, which stop the inward rolling of the pipe or drill stem 12, after the pipe has been released by the outermost pipe kicker bars 20 or 22. A third series of pipe kicker bars 28 and 30, respectively, is positioned on each side of frame 1 and inwardly from the intermediate pipe kicker bars 24 and 26.

Figure 7:
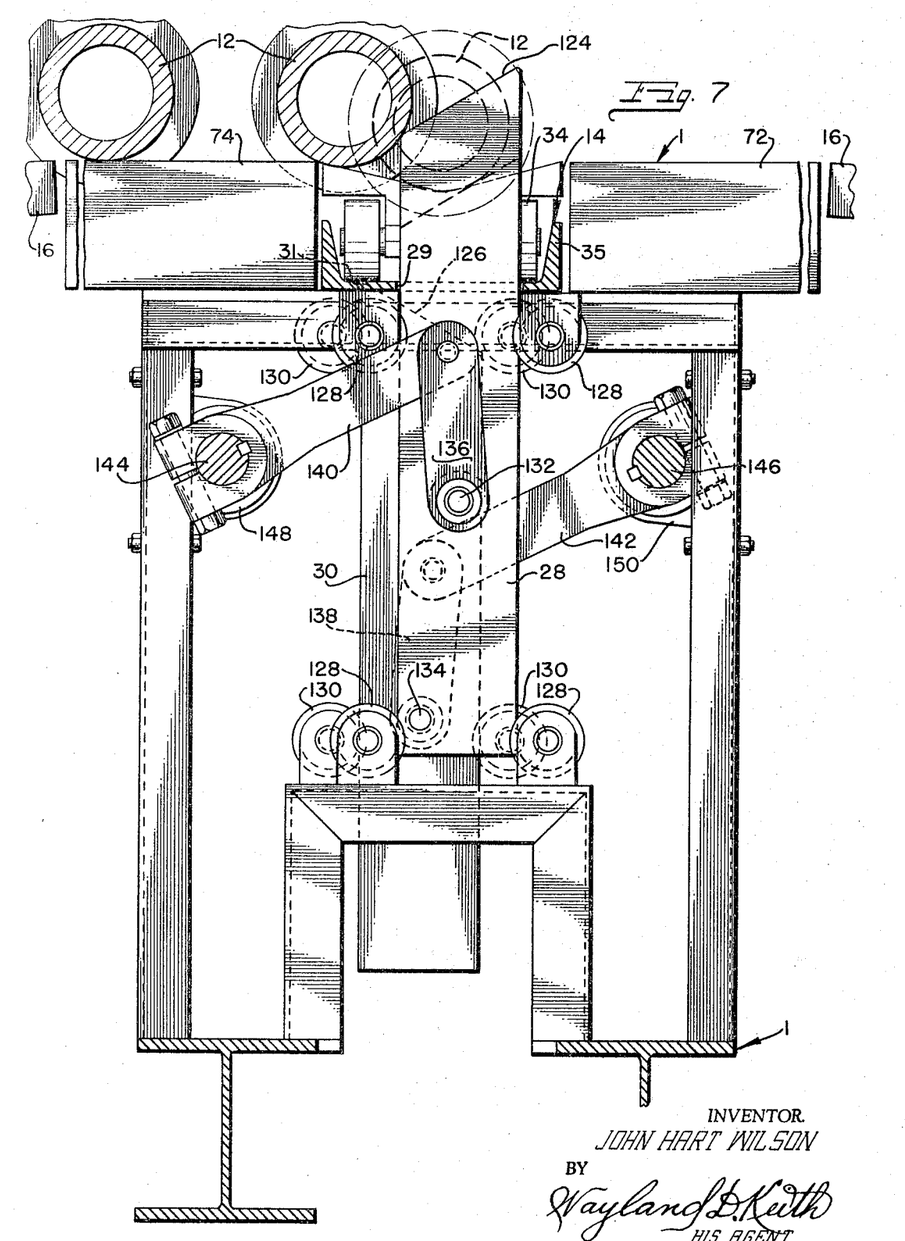
FIG. 7 is a sectional view taken on line 7—7 of FIG. 2, looking in the direction indicated by the arrows, and being on a scale substantially the same as that of FIG. 6, with parts being broken away and shortened, and with parts shown in full and dashed outline to indicate movement of the respective parts and of the drill stem, as the device is actuated.
Figure 14:
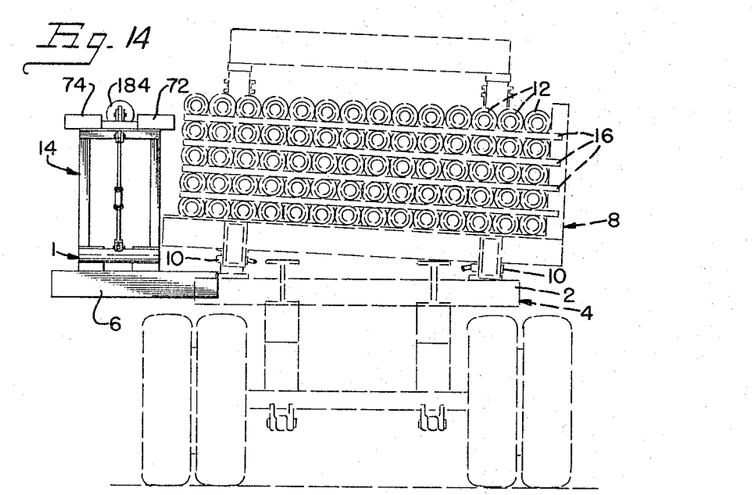
FIG. 14 is a view similar to FIG. 13, but of the pipe hauling and dispensing apparatus in position to receive pipe thereonto from the pipe positioning device.
Figure 18:
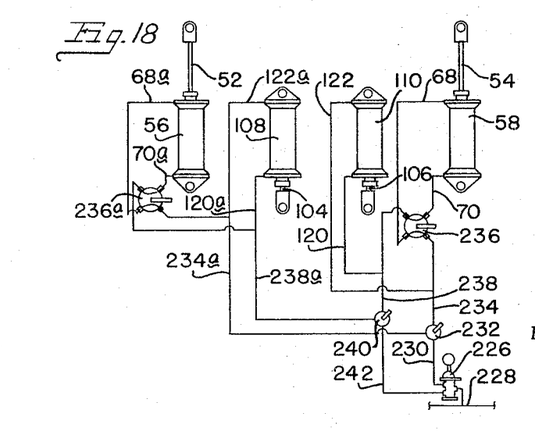
FIG. 18 is a view similar to FIG. 16 but showing one pair of cylinders with the plungers thereof extended, and one pair of cylinders with the plungers thereof retracted so that the transverse kicker elements connected thereto will all be in retracted position.

With the first two series of pipe kicker bars 20 and 22 operated in complementary relation, the drill stem or pipe, which rolls downward from the rack 8 onto the pipe positioner 14, is moved laterally onto wheeled carriers 32 and 34 for longitudinal movement by the wheeled carriers, along a central trackway 35. When the drill stem or pipe is to be removed from the wheeled carriers 32 and 34 and directed onto pipe rack 8, a four-way valve 236 is moved into the position as shown in FIG. 18, which will move all of the kicker bars 20 and 22 downwardly, below the level of support bars 72 or 74. Pipe kicker bars 28 have angulated faces on the upper ends thereof facing in one direction, as will best be seen in FIG. 7, and as indicated at 124. The pipe kicker bars 30 each has an angulated face 126, which faces 126 are in opposed relation to angulated faces 124, as will best be seen in dotted outline in FIG. 7. With the angulated faces 124 and 126 being in opposed relation, the set of kicker bars 28 will direct the drill stem or pipe to one side of the pipe positioner 14 and onto rack 8, when moved inwardly by cylinder 165 urging plunger 162 thereof upward, which operates the associated mechanisms to move the pipe kicker bars rapidly upward to impart a blow which will direct drill stem or pipe 12 into support bar 74, as shown in FIG. 7, thence onto divider strips 16, which strips 16 are inclined downwardly with respect to the upper surface of support bar 74, to direct drill stem or pipe 12 onto rack 8. By moving positioning valves 241 and 256 to a different position, cylinders 164 will be rendered inoperative, and the same function can be performed with cylinder 166 to direct drill stem or pipe off the opposite side of carriers 32 and 34 onto support bars 72 opposite support bars 74.

Shafts 36 and 38, respectively, are journaled in the respective bearings 37 and 39 on elongated structural frame 1. Each of the shafts 36 and 38 has a plurality of outwardly extending arms, 40 and 42, respectively, thereon at spaced longitudinal intervals, which arms are connected to the respective adjustable clevis and rod arrangements 44 and 46, each of which clevis and rod arrangements is connected to the lower end of the respective pipe kicker bars 20 and 22. Each of the shafts 36 and 38 has a further arm 48 and 50, respectively, to which is pivotally connected the respective plungers 52 and 54 of the respective fluid actuated cylinders 56 and 58. The respective cylinders 56 and 58 are pivotally connected to the elongated structural frame 1 by pivot pins 60 and 62, respectively, as will best be seen in FIG. 8. It is preferable that these cylinders be air actuated for instant action, and that each be of the double acting type with air conduits 64 and 66 leading from cyclinder 56, and air conduits 68 and 70 leading from cylinder 58, whereupon, by actuation of the plungers of the respective cylinders in timed sequence, the pipe kicker bars 20 and 22 can move the pipe laterally along the upper face of support bars, such as shown at 72 or 74.

Figure 15:
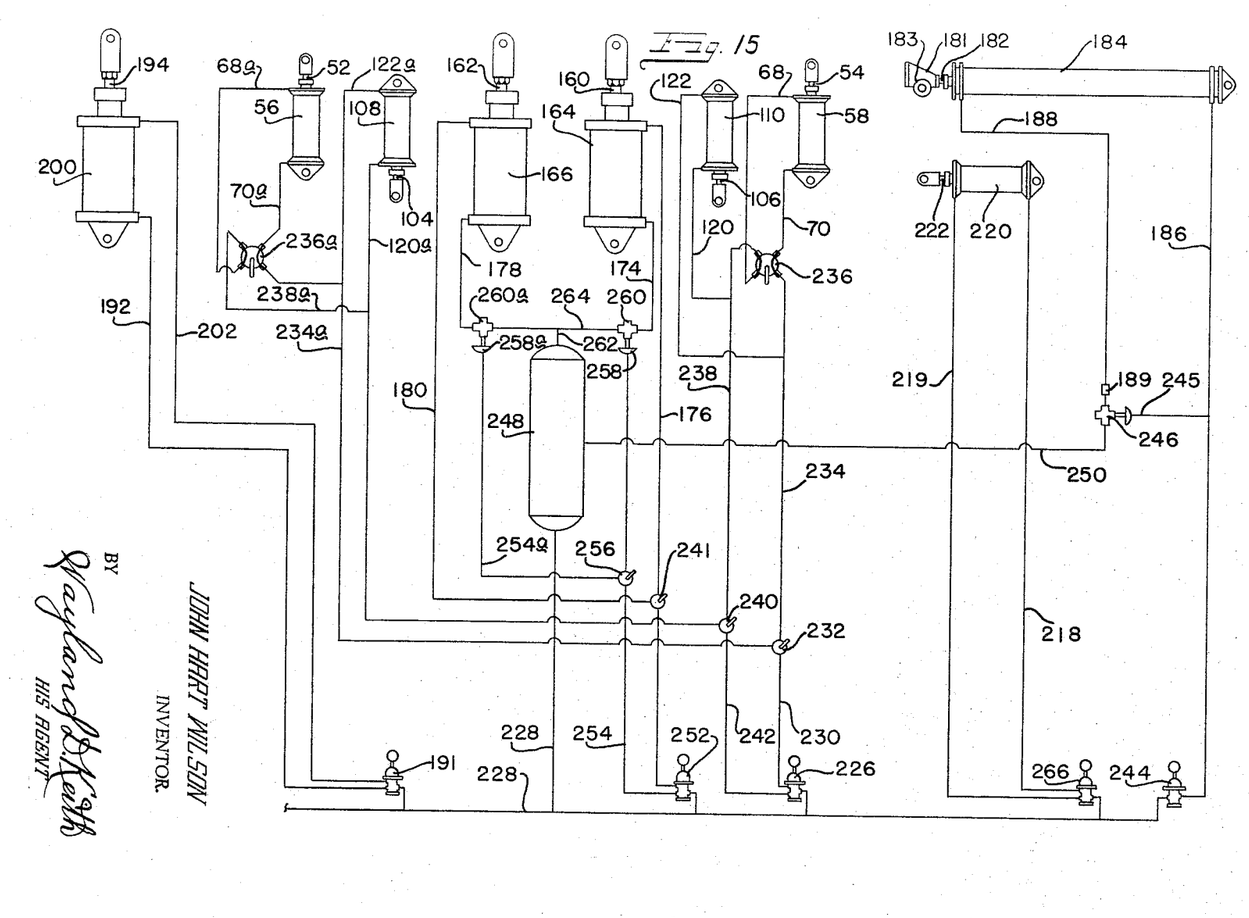
FIG. 15 is a diagrammatic view of the fluid actuated system for actuating the various component parts of the pipe positioning device.

The pipe kicker bars 20 and 22 are guided for substantially vertical movement by rollers 76 and 78, one on each side of each pipe kicker bar 20, and by rollers 80 and 82, one on each side of each pipe kicker bar 22. The pipe kicker bars 20 and 22 move from the position shown in dashed outline, FIG. 8, to the position as shown in full outline therein, upon actuation of the respective plungers 52 and 54. When the pipe kicker bars 20 and 22 are upwardly extended, as shown in dashed outline in FIG. 8, the drill stem or pipe 12, as shown in dashed outline, will be restrained against inward movement, when rolled from the pipe rack 8. However, upon rectraction of pipe kicker bars 20, when pipe is being directed from pipe rack 8 onto support bars 72, the pressure exerted by the pipe rolling from rack 8 will move the drill stem or pipe 12 from the position as shown in dashed outline in FIG. 8 to the position as shown in full outline therein. Then, upon upward movement of kicker bars 20, the intermediate pipe kicker bars 24 will move downward, whereupon, the angulated faces 21 of pipe kicker bars 20 will hit the pipe with such force as to direct the pipe or drill stem 12 onto wheeled carriers 32 and 34, as will be more fully brought out hereinafter. The kicker bars 22 and 26 operate in a similar manner to direct pipe from the support bars 74 onto wheeled carriers 32 and 34, when three-way positioning valves 232 and 240 are switched to a different position to direct air into cylinders 58 and 110 instead of into cylinders 56 and 108. Pipe kicker bars 20 and 24 work in complementary relation, while pipe kicker bars 22 and 26 are inoperative, and pipe kicker bars 22 and 26 operate in complementary relation, when pipe kicker bars 20 and 24 are inoperative, as shown in FIG. 15.

Shafts 84 and 86 are journaled in the respective bearings 85 and 87 on the elongated structural frame 1, and the shaft 84 has a plurality of inwardly extending levers 88 mounted thereon and secured thereto for arcuate movement therewith. The shaft 86 has a plurality of inwardly extending levers 90 mounted thereon and secured thereto for arcuate movement therewith. The respective levers 88 and 90 are pivotally connected to the respective adjustable clevis and rod assemblies 92 and 94, which clevis and rod assemblies are adjustably connected to the lower ends of the respective intermediate pipe kicker bars 24 and 26.

Each shaft 84 and 86 has the respective levers 100 and 102 mounted thereon and secured thereto for arcuate movement therewith. Plungers 104 and 106 of the respective fluid actuated cylinders 108 and 110 are pivotaly connected to the respective levers 100 and 102, with the respective cylinders 108 and 110 being pivotally connected to the elongated structural frame 1 by pivot pins 112 and 114, respectively.

The fluid actuated cylinders 108 and 110 are each, preferably air actuated to enable quick action, when fluid pressure is applied to either end of these double acting cylinders. A conduit 116 connects with one end of the cylinder 108 and a conduit 118 is in fluid communication with the opposite end thereof. A conduit 120 is in fluid communication with one end of the cylinder 110 and a conduit 122 is in fluid communication with the opposite end thereof, which fluid conduits are so connected for selective operation as to enable the fluid actuated cylinders 108 and 110 to selectively actuate the respective intermediate pipe kicker bars 24 and 26, upon selective actuation of valve 226 and by selective positioning of valves 232 and 240, as will be more fully brought out hereinafter. The pipe kicker bars 24 and 26 are for directing pipe from rack 8 onto wheeled carriers 32 and 34.

The innermost pipe kicker bars 28 and 30, FIG. 7, have the respective upper ends thereof angulated, as indicated at 124 and 126, which kicker bars operate in substantially a vertical plane, in guided relation, between sets of rollers 128 and 130, respectively to direct drill stem or pipe from wheeled carriers 32 and 34 laterally onto support bars 72 or 74, thence to the divider strips 16 of rack 8. Each of the kicker bars 28 and 30 has a pivot pin 132 therethrough, to pivotally mount the respective links 136 at one end of each bar. Each of the kicker bars 30 has a pivot pin 134 therethrough to pivotally mount the respective links 138 at one end of each bar. The other end of the respective links 136 and 138 is pivotally attached to the respective levers 140 and 142, which levers are mounted on and secured to the respective longitudinal shafts 144 and 146, which shafts are journaled in the respective bearings 148 and 150 on elongated structural frame 1.

Figure 6:
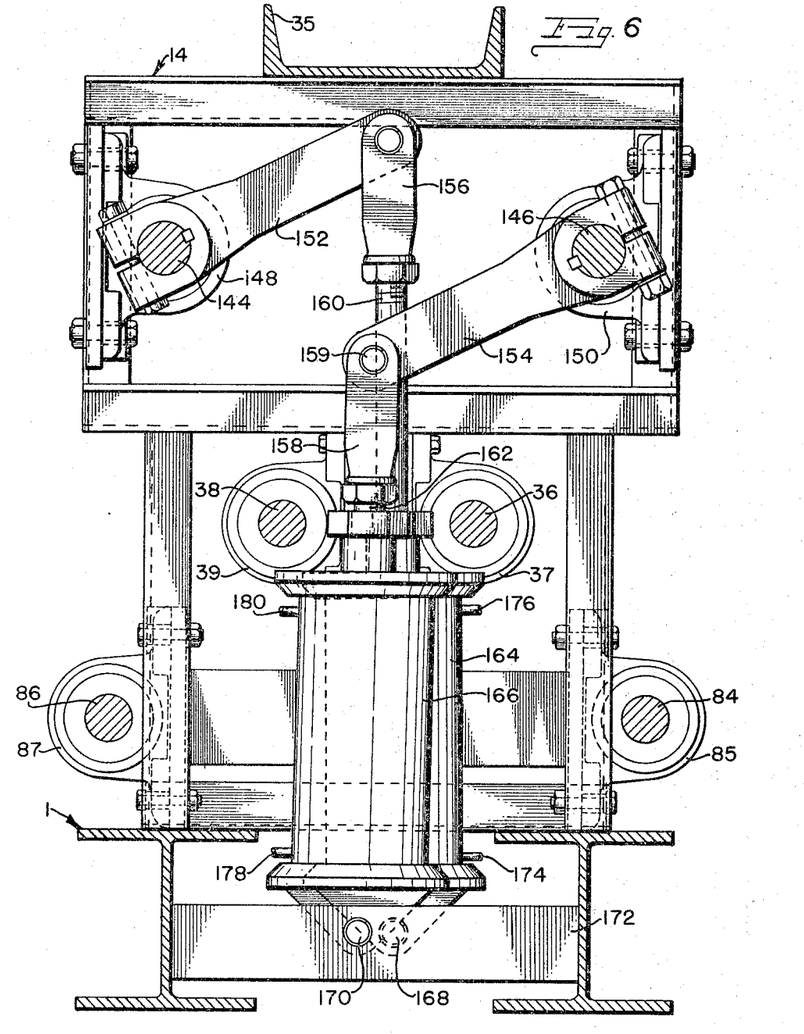
FIG. 6 is a sectional view taken on line 6—6 of FIG. 2, looking in the direction indicated by the arrows and being on a greatly enlarged scale with respect to FIGS. 1 through 5.

The respective shafts 144 and 146 have the respective levers 152 and 154 secured thereto and rotatable through an arcuate movement therewith. The distal end of each lever 152 and each lever 154 is connected to the respective clevises 156 and 158, which clevises are mounted upon the upper end of the respective plungers 160 and 162, which extend into the respective fluid cylinders 164 and 166, as shown in FIG. 6.

Each of the fluid cylinders 164 and 166 is pivotally connected, by the respective pivot pins 168 and 170, to a transverse bar 172 which extends between the lower portions of elongated structural frame 1. The cylinders 164 and 166 are fluid actuated, with cylinder 164 having conduits 174 and 176 leading from the respective ends thereof to a source of fluid supply under pressure, which is controlled by a valving mechanism, as will be more fully brought out hereinafter. The hydraulic cylinder 166 has conduits 178 and 180 leading from the opposite ends thereof for actuating the cylinder by fluid pressure. The conduits 178 and 180 extend to the source of fluid supply, preferably air under pressure, which fluid is controlled by valves, as will be more fully brought out hereinafter.

Upon actuation of plungers 160 and 162, by air pressure, the respective levers 152 and 154 are moved to rotate the respective shafts 144 and 146. Upon rotation of shaft 144, levers 140 are actuated to raise and lower a plurality of innermost kicker bars 28, as links 136 interconnect the kicker bars 28 therewith. Each pipe kicker bar 28 is guided within guide rollers 128 so that the pipe kicker bars 28 will move vertically up through the respective slots 29 within trackway 35, with the angulated ends 124 thereof performing an angular kicking action to move pipe or drill stem 12 from the position as shown in dashed outline in FIG. 7 to the position as shown in full outline therein.

Upon cylinder 166 actuating plunger 162, which is connected to lever 154 by a pivot pin 159 which passes through an aperture in clevis 158 and an aperture in the distal end of lever 154, the lever 154 is moved arcuately to rotate shaft 146, which, in turn, moves a plurality of levers 142 which are pivotally attached to links 138, which links are attached to pipe kicker bars 30, which kicker bars are each journaled for vertical movement between pairs of rollers 130, which innermost pipe kicker bars 30 pass upward through slots 31 in trackway 35, which slots 131 are similar to slots 29, but are in off-set relation with respect thereto. The innermost kicker bars 30 have angulated ends 126 thereon, which are in opposed relation with respect to the angulated ends 124 on pipe kicker bars 28.

Each of the sets of innermost kicker bars 28 and 30 move through approximately the same vertical distance. Then, when in one position, the bars are retracted to a position below the upper face of trackway 35, but, when in fully extended position, they extend upward above the upper face of outwardly extending support bars 72 and 74. In this manner the drill stem or pipe 12 is moved from a position on the wheeled carriers 32 and 34, as shown in dashed outline in FIG. 7, to the position as shown in full outline in FIG. 7, and with pipe kicker bars 20 and 22 retracted so the ends thereof will be below the upper surface of support bars 72 and 74 by the movement of valve 236 to the position as shown in FIG. 18, and with the positioning valves 232 and 240 in the proper position, the pipe is ready to be moved laterally from wheeled carriers 32 and 34 onto support bars 72 or 74, depending upon the position of valves 232 and 240. Since the upward movement of the innermost pipe kicker bars 28 and 30 is with an impact, the angulated ends 124 and 126 will move the pipe or drill stem 12 laterally, either onto support bars 74 or onto support bars 72. The impact is of sufficient force, when air cylinders are used, that the pipe or drill stem 12 will roll the full length of support bars 74 or 72 and be directed onto divider strips 16, which are inclined so that the pipe will be directed onto rack 8 or onto a pipe hauling and dispensing apparatus, as shown in FIG. 14.

The wheeled carriers 32 and 34 are provided on trackway 35 for moving drill stem or pipe 12 longitudinally, either into a position to be picked up by pipe elevators of a rotary drilling rig, or to be received from the pipe elevators of a rotary drilling rig onto the wheeled carriers for subsequent transfer onto divider strips 16 of pipe rack 8 or Pipe Hauling and Dispensing Apparatus as shown in FIGS. 13 and 14.

The wheeled carrier 32 has an upstanding abutment 33 on the end thereof, which abutment is engageable with an end of pipe or drill stem 12, so upon movement of plunger 182 by air cylinder 184, the wheeled carrier will be moved longitudinally along trackway 35, upon introduction of air into conduit 186, with the air exhausting out of conduit 188, the air to and from said conduits being controlled by a valving mechanism, as will be more fully brought out hereinafter.

Figure 1:
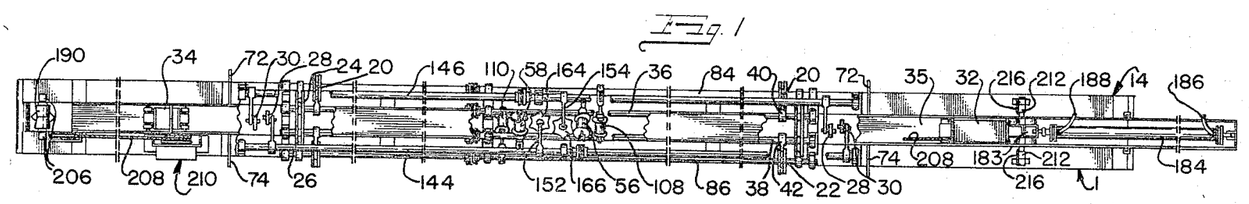
FIG. 1 is a top plan view of the pipe positioning device, with parts broken away and parts removed, and showing the operating elements of the device.
Figure 2:
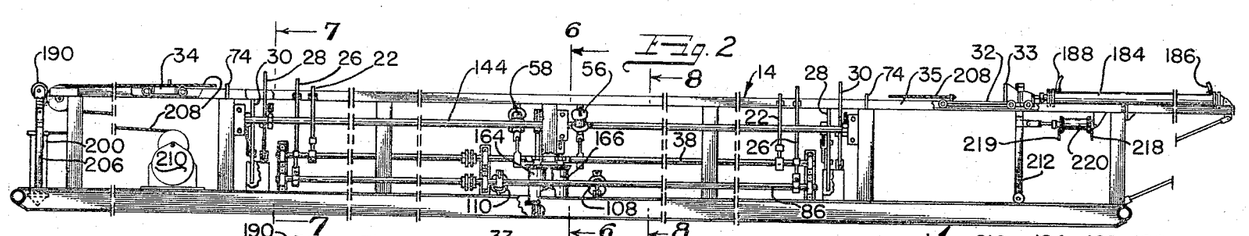
FIG. 2 is a side elevation of the pipe positioning device with parts broken away and removed, with the device being shown on substantially the same scale as shown in FIG. 1.
Figures 3, 4:
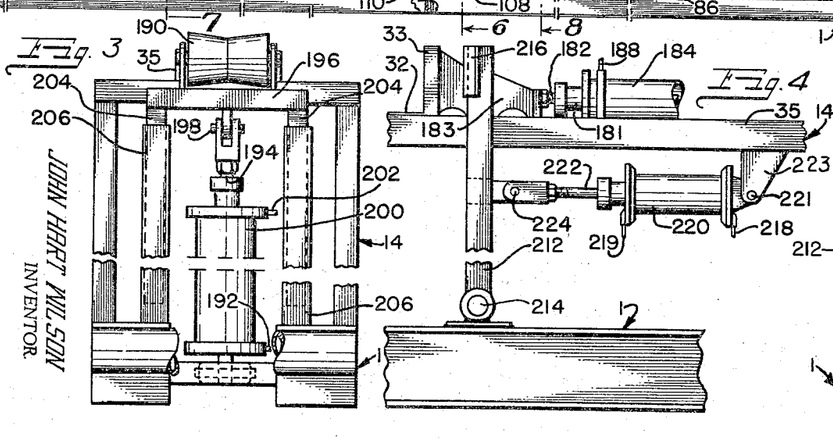
FIG. 3 is an end elevational view of the pipe positioning device, on an enlarged scale, with parts broken away and shortened and shown in section to bring out the details of construction.
FIG. 4 is a fragmentary side elevational view of a portion of the mechanism of the pipe positioner device, with parts being broken away and shortened to bring out the details of construction.
Figure 5:
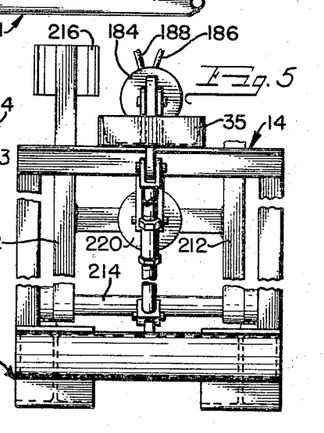
FIG. 5 is an end elevational view on an enlarged scale taken from the opposite end as that shown in FIG. 3, with parts broken away and shortened to bring out the details of construction.

With the pipe being moved longitudinally along trackway 35 on wheeled carriers 32 and 34, an end of the pipe 12 will be moved to a point above roller 190 which roller has a V-shaped groove therein, as will best be seen in FIG. 3, whereupon air will be directed from air supply conduit 228 through four-way air control valve 191 into conduit 192 into the lower end of cylinder 200, to urge plunger 194 therein upward, and with the plunger 194 connected to crossbar 196, by a pivot pin 198, the roller 190 and an end of pipe or drill stem 12 will be elevated by air cylinder 200, with the air being exhausted from the cylinder through conduit 202 to exhaust through valve 191 to the atmosphere.

The crossbar 196 has downwardly extending guide members 204 thereon which fit in complementary guided relation within tubular guide members 206. When the pipe 12 is lifted to the desired height, pipe elevators of the drilling rig are connected thereto, the wheeled carrier 32 supports the trailing end of the pipe or drill stem substantially the full length of trackway 35, while the pipe or drill stem is going into the well. This is repeated until sufficient pipe is run into the well to enable drilling operations to proceed.

Figure 9:
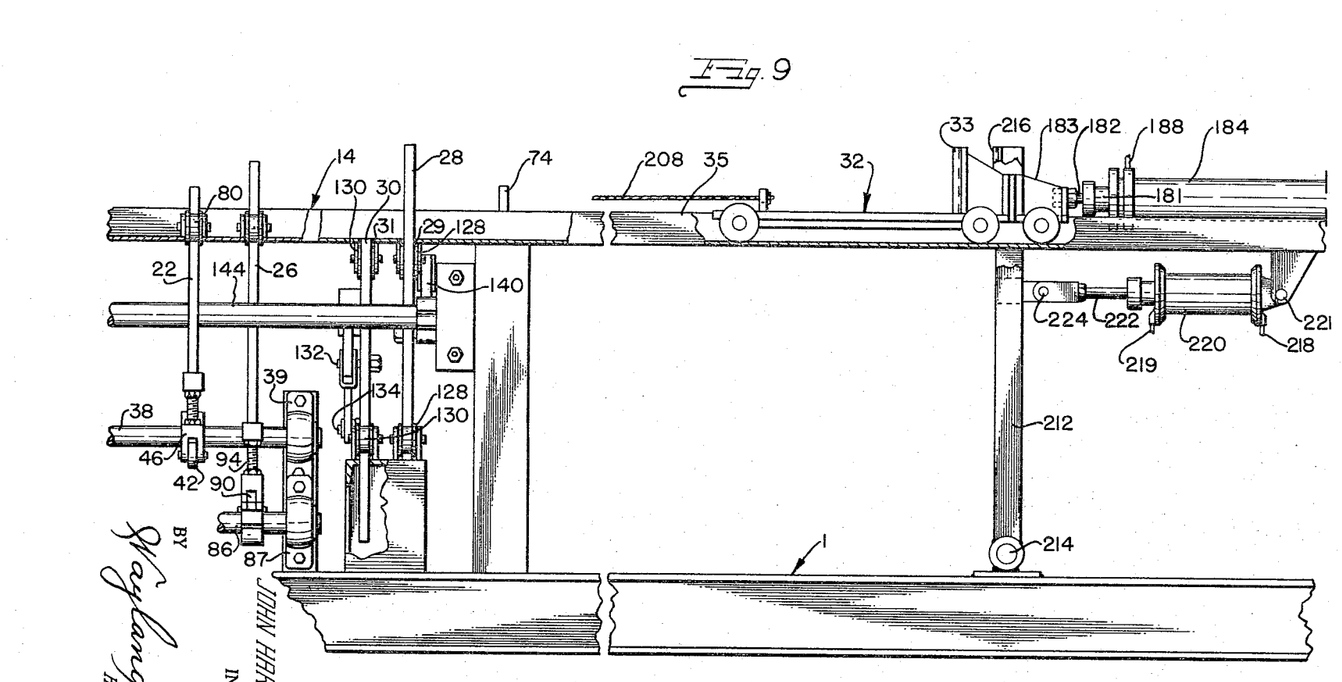
FIG. 9 is a fragmentary side elevational view showing the pipe positioning device on substantially the same scale as shown in FIGS. 3 through 5, showing the relation between the pipe positioning carrier and the fluid actuated cylinder associated thereto, and showing certain "kicker" mechanism for moving the pipe transversely of the pipe positioning frame.
Figure 10:
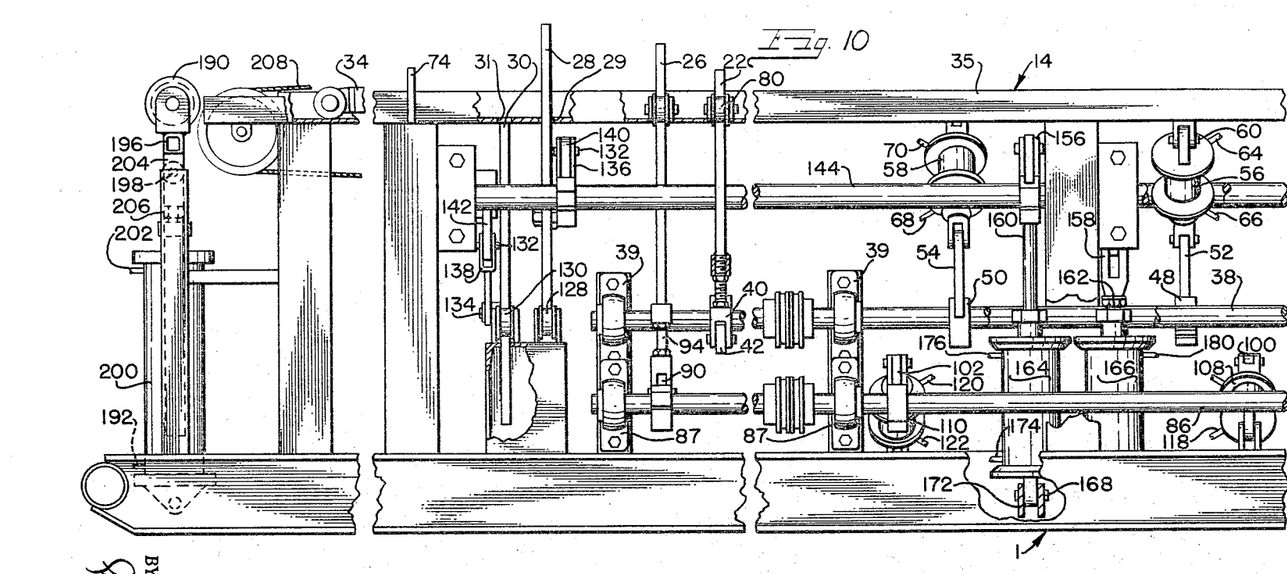
FIG. 10 is a view similar to FIG. 9, but of the other end portion of the pipe positioning device, showing the various cylinders which operate the pipe "kicker" mechanism for moving the pipe transversely of the pipe positioning device, and showing a fluid actuated cylinder for elevating the pipe or drill stem to enable the pipe handling elevators to be attached to the pipe or drill stem.
Figure 11:
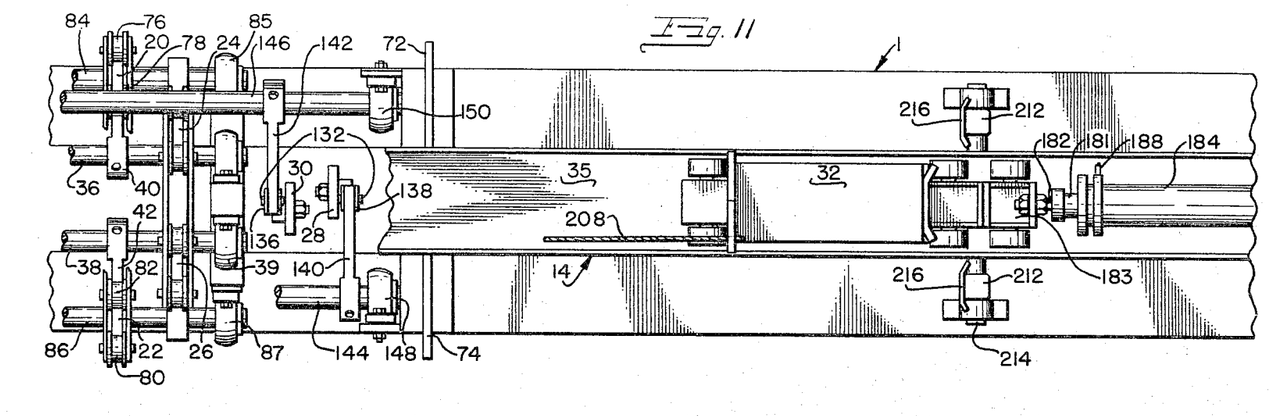
FIG. 11 is a fragmentary top plan view of the portion of the pipe positioning device as shown in FIG. 9.
Figure 12:
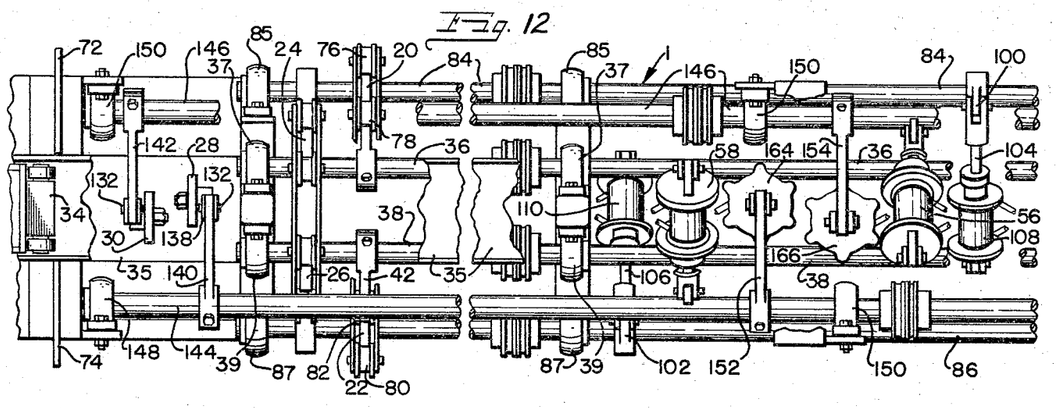
FIG. 12 is a fragmentary top plan view of a portion of the mechanism as shown in FIG. 10, and being on the same scale.

When it is desired to remove pipe or drill stem from a well, a cable or line 208 is attached to the wheeled carrier 32 which cable or line is wound onto a spring actuated winding mechanism 210 to normally wind the cable 208 onto the reel of the spring actuated winding mechanism 210 to move the wheeled carrier 32 adjacent the drilling rig, whereupon an end of the pipe or drill stem 12 is placed upon the wheeled carrier 32 at an angle, then upon lowering the pipe elevators and drill stem or pipe, the wheeled carrier 32 is moved outward along trackway 35 to position the wheeled carrier in a position as shown in FIG. 9, in so doing the spring in spring actuated winding mechanism 210 is wound up, and after the drill stem or pipe is laid in horizontal position and the elevators removed therefrom, the innermost kicker bars 28 and 30 are actuated to move the drill stem or pipe 12 from the wheeled carriers 32 and 34 onto a support bar 74 or the support bar 72, thence it will roll onto rack 8. Upon removal of pipe 12 from the wheeled carriers 32 and 34, the line or cable 208 is reeled in by spring actuated winding mechanism, which will draw the carrier 32, by spring action, along trackway 35 into close proximity to the drilling rig to enable further lengths of pipe or drill stem to be lowered thereinto.

In directing pipe or drill stem from pipe rack 8 onto the pipe positioning apparatus, it is desirable to position the pipe longitudinally so that it will be free to roll onto carrier 32 without striking upstanding abutment 33. This is accomplished by upright arms 212, which are pivotally mounted on a transverse shaft 214 mounted on the upper face of frame 1. The arms 212 extend upward and have angulated steel plates, as indicated at 216, on the upper ends thereof, which angulated plates are at a height to register with the ends of pipe being directed onto the support bars 72 and 74.

With the pipe 12 positioned on support bars 72 or 74, air under pressure, from a source of air supply, is directed from air supply conduit 228 into cylinder 220, at the end thereof opposite the plunger 222, and the air in the opposite end of cylinder 220 is directed out through conduit 219, to exhaust through an exhaust port in the valve 266, as the plunger is moved outwardly. The cylinder 220 is pivotally mounted on a pin 221 which passes through an apertured lug on the end of cylinder 220 and through downwardly extending lugs 223 on the lower side of trackway 35. The plunger 222 is pivotally connected, by a pin 224, to the upright arm 212. This causes arm 212 and angulated plates 216 to move inward toward the drilling rig and to engage the respective adjacent ends of the pipe or drill stem to move the pipe or drill stem to a predetermined position longitudinally toward the rig ahead of abutment 33, preparatory to the outermost kicker bars 20 or 22 moving the pipe or drill stem onto carriers 32 and 34 when the intermediate kicker bars 24 and 26 are in retracted position. The upstanding abutment 33 moves against the end of the pipe or drill stem 12 to move the drill stem or pipe longitudinally by the plunger 222 by air under pressure and is directed from air supply conduit 228 through three-way control valve 244 into conduit 186 to also simultaneously direct air into conduit 245 to actuate a spring loaded diaphragm valve 246 to open valve 246 to release air from the plunger end of cylinder 184 through conduit 188; simultaneously air under pressure is directed through conduit 186 to the end of air actuated cylinder 184 opposite the plunger 182 thereof to urge plunger 182 thereof outwardly. The plunger 182 has a head 181 thereon which is supported by a wheeled carrier 183.

OPERATION

To perform the various operational functions for the pipe positioning apparatus, which is preferably used in conjunction with a pipe hauling and dispensing apparatus, as shown in dashed outline in FIGS. 13 and 14, the pipe hauling and dispensing apparatus is loaded with pipe as shown in FIG. 13. The pipe hauling and dispensing apparatus is operated by jacks 10 on each corner thereof opposite the pipe positioner 14 so as to angulate the pipe rack 8 and divider strips 16 so that the divider strips 16, which will have a tendency to roll the pipe or drill stem 12 towards the pipe positioning apparatus, will be so raised so that the upper surface of a divider strip 16 will be in substantially aligned relation with the upper surface of pipe support bars 72 or 74 on the pipe positioner 14. With the pipe rolling from either side onto the pipe positioner 14, the pipe positioner is ready to perform the function of removing pipe transversely from the divider strip 16 to be directed onto the carriers 32 and 34. To accomplish this, a four-way control valve 226 is manipulated, FIG. 16, which will direct air from air supply conduit 228 into and through four-way control valve 226 into conduit 230, and with three-way positioning valve 232 in position to direct air into conduit 234, thence simultaneously into conduit 122 leading to the end of the air cylinder 110 opposite plunger 106 thereof and also into four-way switching valve 236, FIG. 16, and with the four-way switching valve 236 in position as shown in FIGS. 16 and 17 to direct air through conduit 70 into the end of air actuated cylinder 58 opposite the plunger 54 thereof, this will cause plungers 54 and 106 to be projected, FIG. 17.

Upon projecting plunger 54, which is connected to lever 50, which is mounted on and secured to shaft 38, the lever 50 and outwardly extending arm 42 are moved about the axis of shaft 38, which will move kicker bars 22 downward, which will permit the pipe or drill stem 12 to roll from the position as shown in dashed outline in FIG. 8, to the position as shown in full outline therein with the intermediate kicker bars 26 arresting the rolling movement of pipe or drill stem 12. This will permit another length of pipe or drill stem to roll into the position, as indicated in full outline, on support bars 74. Simultaneously with the projection of plungers 54 and 106, air from cylinders 58 and 110 is discharged out through air line 68 and conduit 120. The air which is directed out through conduit 68, FIG. 17, will be directed through four-way valve 236 and into conduit 238. Simultaneously, air which is directed out of cylinder 110 through conduit 120, will also be directed into conduit 238 and with the air discharged from cylinders 58 and 110 passing out through three-way switching valve 240 into conduit 242 to be discharged to atmosphere through a port in four-way control valve 226.

Figure 16:
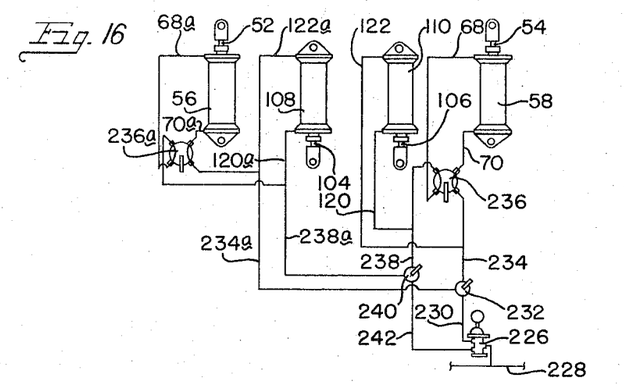
FIG. 16 is a diagrammatic view showing only the air actuated cylinders which operate the kicker bars to move pipe transversely onto the wheeled carriers onto the pipe positioning device and showing the plungers of the cylinders in retracted position.
Figure 17:
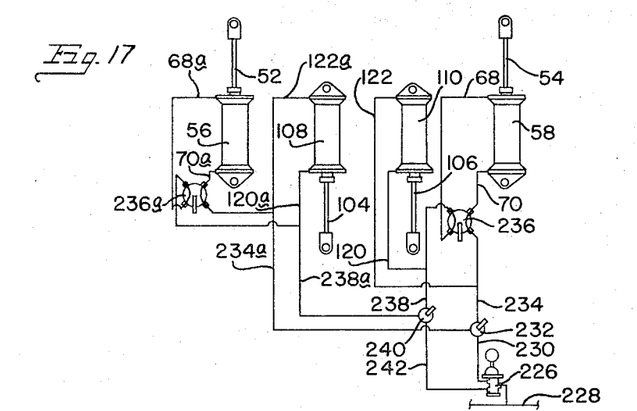
FIG. 17 is a view similar to FIG. 16, but showing the plungers in extended position.

With the pipe or drill stem 12 in position, as shown in full outline in FIG. 8, on support bars 74, air is directed by four-way switching valve 226 into conduit 242, thence through three-way switching valve 240 into conduit 238 and simultaneously into air line 68 and conduit 120 to direct the air to the plunger ends of the respective cylinders 58 and 110 as shown in FIG. 16 to cause retraction of plungers 54 and 106 as shown in FIG. 16. The cylinder 58 will retract plunger 54 to move lever 50 and arms 42 about the axis of shaft 38. Simultaneously, air will be directed into cylinder 110 to retract plunger 106 to move lever 102 and levers 90 about the axis of shaft 86 to move kicker bars 26 downward simultaneously with the movement of kicker bars 22 upward, from the positions as shown in full outline to the positions shown in dashed outline in FIG. 8, with the air exhausting out of cylinder 58 into air line 70 and thence through four-way switching valve 236 into conduit 234. Simultaneously the air from the end of cylinder 110 opposite the plunger thereof, will be exhausted into conduit 122 and thence into conduit 234 through three-way positioning valve 232 into conduit 230 and out through an open port in four-way control valve 226 to atmosphere. In so doing the pipe 12 is moved laterally onto carriers 32 and 34 on trackway 35 which is in the central position, as shown in full outline in FIG. 8.

With the pipe or drill stem 12 positioned on dollies 32 and 34, air is directed from air supply line 228 through air control valve 244 into conduit 186 into the end of the cylinder 184 opposite the stuffing gland thereof, thence the air from cylinder 184 is exhausted out through conduit 188 through restricted flow and check valve 189 and out through four-way air actuated, diaphragm control valve 246. As the diaphragm in valve 246 is simultaneously actuated to exhaust air from the plunger end of cylinder 184 through conduit 188, upon air pressure being applied through conduit 245 to the diaphragm of air actuated control valve 246. When the desired stroke of plunger 182 has been made, the air control valve 244 is moved into position to release air from conduit 186 and conduit 245 and to close the air supply conduit 228. In so doing a spring actuated element, in the conventional four-way air actuated control valve 246, moves the mechanism within valve 246 to close the exhaust port thereof and to direct air through conduit 250, valve 246, through restricted flow and check valve 189 into conduit 188 to move plunger 182 into retracted position, as shown in FIGS. 9 and 15.

It is preferable to have an air supply tank 248 in close proximity to the air actuated mechanism to which the air supply line 228 is connected, and from which tank an air conduit 250 leads to air actuated control valve 246 to enable the valve 246 to be operated by remote control.

The direction of pipe or drill stem onto the wheeled carriers will continue in this manner until each layer of pipe or drill stem is exhausted from the divider strips 16, whereupon, the jacks 10 are elevated to bring the upper surface of the next divider strips 16 in aligned relation with the upper surface of support bars 18, and the routine, as above set out, is repeated and the same angularity of the divider strips 16 is maintained until the last layer of pipe or drill stem is unloaded from the pipe rack 8. When sufficient pipe has been dispensed from one or both sides of the pipe positioner 14, the drilling operation may be begun.

The drilling is continued until it is desired to remove the pipe from the bore hole being drilled, whereupon, valves 236 and 236a are moved into the position as shown in FIG. 18, whereupon air is directed from air supply conduit 228, through valve 226 through conduit 242 and through three-way switching valve 240, thence either into conduit 238 or into conduit 238a and through four-way switching valve 236 or through four-way switching valve 236a and into conduits 70 or 70a and into the end of cylinder 58 or into cylinder 56 opposite the respective plungers to urge the respective plungers 54 and 52 outward, which plungers are connected to kicker bars 22 and 20, respectively, through levers, arms, and shafts to retract kicker bars 20 and 22, simultaneously air is directed from conduit 238 into conduit 120 or conduit 120a and into cylinders 110 or 108 at the respective plunger ends thereof to retract plungers 106 and 104, which are connected to levers and shafts to retract intermediate kicker bars 26 or intermediate kicker bars 24, from the position as shown in full outline in FIG. 8 to the position shown in dashed outline therein.

The pipe is elevated until it is at a sufficient height above the derrick floor that it may be unscrewed, the lower end of the pipe is placed upon a wheeled carrier 32 and the wheeled carrier moves outward along trackway 35 against the tension of a spring in cable winding device 210 as the cable 208 is attached to the wheeled carrier. When the pipe reaches the end of the trackway 35 against head 181 on plunger 182, the pipe or drill stem is then laid, in a prone position, on wheeled carriers 32 and 34. The pipe handling elevators are then disconnected from the pipe or drill stem 12, then by moving valve 252 into one position, air is directed from conduit 228 into conduit 254, and with directing valve 256 in one position, air pressure will be impressed upon the diaphragm 258 or 258a of remote control valve 260 or 260a which will cause the valve 260 or 260a to move into open position against spring tension, which will permit air to be directed from air supply tank 248, through branch pipe 262 into conduit 264 and through open control valve 260 or 260a into the lower end of cylinder 164 or 166; whereupon, plunger 160 or 162 is moved upward, which plungers are pivotally connected to the respective levers 152 and 154, which in turn, rotates shaft 144 or shaft 146 to move levers 140 or levers 142 upward, which respective levers are connected to pipe kicker bars 28 by links 136 and pins 132 or by links 138 and pins 134.

With respect to the operation of cylinder 164 to operate kicker bars 28, the drill stem on the dollies is shown in dashed outline, FIG. 7. Whereupon, the kicker bars 28 are moved from the position as shown in dashed outline position in FIG. 7 to the full line position shown therein, whereupon, the impact on the drill stem or pipe 12 will move it into a second position, adjacent thereto, as shown in full outline in FIG. 7, with such force that the drill stem or pipe rolls into a third position, as indicated in full outline, near the end of support bars 74, thence onto divider strips 16 into racked position on the pipe rack 8. With the pipe or drill stem being acted upon with impact force, it will be caused to roll along the upper face of support bars 74 and onto divider strips 16, which have been brought into an angulated position by jacks 10 on pipe hauling and dispensing apparatus, so that the pipe or drill stem will roll downward along divider strips 16, is indicated in FIG. 14, until each layer is complete, whereupon, by lowering the jacks 10 until the upper face of each divider strip is in register with the upper surface of support bars 74, the operation continues until the pipe hauling and dispensing apparatus is loaded with pipe or drill stem.

Having thus clearly shown and described the invention, what is claimed as new and desired to be secured by Letters Patent is:

1. In combination, a portable pipe hauling and dispensing device comprising:
    (a) a wheeled frame,
    (b) a pipe rack mounted on said wheeled frame and being movable both vertically and angularly with respect thereto,
    (c) jack means mounted on said wheeled frame for elevating said pipe rack to different vertical levels,
        (1) said jack means being adapted to selectively elevate a corner of said pipe rack,
    (d) a pipe positioning device mounted on said wheeled frame of the portable pipe hauling and dispensing device, and including an elongated frame,
        (1) a trackway mounted on said pipe positioning device, longitudinally thereof,
        (2) a wheeled carrier moveably mounted on said trackway,
    (e) support bars mounted on said pipe positioning device which extend into close proximity to layers of pipe on said pipe rack of the pipe hauling and dispensing device,
    (f) kicker bars mounted on said elongated frame intermediate the length of said support bars and associated therewith to move the pipe transversely of said elongated frame,
    (g) actuator means to selectively actuate certain kicker bars to direct pipe transversely from said elongated frame onto said wheeled carrier on said trackway,
    (h) a fluid actuated cylinder associated with said wheeled carrier to move said wheeled carrier and the pipe thereon longitudinally on said trackway, and
    (i) elevating means associated with said elongated frame of said pipe positioning device to elevate an end of said pipe relative to said elongated frame.

2. A pipe positioning device, which device comprises:
    (a) an elongated frame,
    (b) a trackway positioned longitudinally on said elongated frame, along the upper surface thereof,
    (c) two pairs of longitudinally spaced apart, innermost upright kicker bars being associated with said elongated frame, with at least a portion of each said innermost, upright, kicker bar lying between vertical planes coextensive with the outer confines of said longitudinal trackway,
    (d) each bar of each pair of said innermost, upright kicker bars having the outer side thereof lying outwardly from a vertical, medial plane which passes longitudinally through said trackway,
        (1) each said kicker bar having an angulated upper face thereon which slopes downwardly and outwardly with the angulated faces of the respective pairs of said innermost kicker bars being in opposed relation to direct pipe laterally outward,
        (2) said longitudinally spaced apart, innermost upright kicker bars being adapted to be moved to a position below a horizontal plane which is coextensive with the upper surface of said trackway, when said kicker bars are in one position, and to extend above said plane when said innermost kicker bars are in another position,
    (e) support bars mounted on said elongated frame near the upper surface thereof and extending laterally outward therefrom,
    (f) two pairs of longitudinally spaced apart, outermost, upright kicker bars, the bars of each pair of said outermost, upright kicker bars being associated with said frame intermediate the length of said laterally extending support bars, a spaced distance outward from said trackway and lying in an upright plane approximately parallel thereto,
    (g) each bar of said pairs of outermost kicker bars having angulated faces near the upper end thereof, one of which faces slopes downwardly and inwardly, a second of which faces, on each said kicker bar, slopes downwardly and outwardly,
    (h) actuator means associated with said frame and with each said pair of longitudinally spaced apart pairs of kicker bars to selectively and simultaneously move each pair of said kicker bars in an upright plane, independently of the other pairs of said kicker bars,
    (i) control means interconnected with said actuator means and being remote from said frame to selectively operate pairs of said longitudinally spaced apart kicker bars on said frame to move pipe laterally in either direction with respect to said elongated frame,
    (j) a wheeled carriage movably mounted on said longitudinal trackway,
    (k) power means associated with said elongated frame and with said wheeled carriage to selectively move said wheeled carriage longitudinally on said trackway, and
    (l) further control means interconnected with said power means and being remote from said frame, to selectively operate said wheeled carriage to move pipe longitudinally on said trackway.

3. A pipe positioning device, which device comprises;
    (a) an elongated frame,
    (b) a trackway positioned longitudinally on said elongated frame, along the upper surface thereof,
    (c) a pair of longitudinally spaced apart, innermost, upright kicker bars, the bars of said pair of said innermost, upright kicker bars being associated with said elongated frame, with at least a portion of each said innermost kicker bar lying between vertical planes coextensive with the outer confines of said longitudinal trackway,
    (d) said longitudinally spaced apart, innermost, upright kicker bars being adapted to move to a position below a horizontal plane, which plane is coextensive with the upper surface of said trackway, when said kicker bars are in one position, and to extend above said plane when said innermost kicker bars are in another position,
    (e) support bars mounted on said elongated frame near the upper surface thereof and extending laterally outward therefrom,
    (f) a pair of intermediate, upright kicker bars, each bar of said pair of intermediate, upright kicker bars having an angulated face thereon, which angulated faces slope downwardly and outwardly,
        (1) said pair of longitudinally spaced apart, intermediate, upright kicker bars being mounted on said elongated frame, outward from said trackway, and lying in a plane substantially parallel thereto,
        (2) said longitudinally spaced apart, intermediate, upright kicker bars being adapted to be moved to a position below a horizontal plane, which plane is coextensive with the upper surface of said support bars, when said intermediate kicker bars are in one position and to extend upward above said plane when said intermediate kicker bars are in another position,
    (g) a pair of longitudinally spaced apart, outermost, upright kicker bars, the bars of said pair of said outermost, upright kicker bars being associated with said frame intermediate the length of said laterally extending support bars, a spaced distance outward from said trackway, and lying in a plane substantially parallel thereto,
    (h) each bar of said pair of outermost kicker bars having angulated faces near the upper end thereof, one of which faces slopes downwardly and inwardly, and a second of said faces on each said kicker bar slopes downwardly and outwardly, (i) actuator means associated with said frame and with said pairs of longitudinally spaced apart pairs of kicker bars to selectively and simultaneously move a pair of said kicker bars in an upright plane, independently of the other pairs of said kicker bars.

(j) control means interconnected with said actuator means and being remote from said frame to selectively operate pairs of said longitudinally spaced apart kicker bars on said frame to move pipe laterally in either direction with respect to said elongated frame, (k) a wheeled carriage movably mounted on said longitudinal trackway, (l) power means associated with said elongated frame and with said wheeled carriage to selectively move said wheeled carriage longitudinally on said trackway, and (m) further control means interconnected with said power means and being remote from said frame, to selectively operate said wheeled carriage to move pipe longitudinally on said trackway.

4. A pipe positioning device as defined in claim 2; wherein (a) a movable plate means is associated with said elongated frame to pre-position said pipe longitudinally with respect to said trackway at a predetermined longitudinal location to enable said pipe to be directed laterally onto said wheeled carriage, (b) fluid actuated means connected to said movable plate means to selectively move said movable plate means, and (c) fluid control means connected to said fluid actuated means to control said fluid actuated means.

5. A pipe positioning device as defined in claim 3; wherein (a) said actuator means associated with said frame and with each said pair of longitudinally spaced apart pairs of kicker bars are air actuated cylinders.

6. A pipe positioning device, which device comprises;

(a) an elongated frame, (b) a trackway positioned on said elongated frame along the upper surface thereof, (c) support bars mounted on the frame near the upper surface thereof and extending laterally therefrom, (d) a wheeled carrier movably mounted on said trackway, (e) a plurality of kicker bars associated with said frame and being coextensive with said support bars and said trackway, (1) said kicker bars comprising at least two bars to form a seat,
(i) the bars of each set of kicker bars being spaced apart longitudinally on said elongated frame, (2) a first set of said kicker bars being positioned to operate within the confines of said trackway and being adapted to extend upward therethrough.
(i) means retaining said first set of kicker bars below a plane which is coextensive with the surface of said support bars, (3) a second set of said kicker bars being positioned to deliver impact blows on the cylindrical surface of the pipe to move the pipe transversely from said wheeled carrier outwardly onto said support bars of the pipe positioning device.

(f) an air actuated cylinder associated with each said set of kicker bars whereby one set of said kicker bars will be moved upward simultaneously with the downward movement of another set of said kicker bars to direct pipe or the like laterally from a pipe rack onto said wheeled carrier on the pipe positioning device, (g) power means associated with said elongated frame to selectively move said wheeled carrier, and (h) control means associated with said frame remote from said wheeled carrier and from said kicker bars to selectively operate said wheeled carrier and said kicker bars to move pipe longitudinally and laterally with respect to said elongated frame.

7. A pipe positioning device comprising:

(a) an elongated frame, (b) a trackway positioned on said elongated frame near the upper surface thereof, (c) a wheeled carrier movably mounted on said trackway, (d) pipe support bars mounted on said elongated frame transversely thereof, near the upper surface thereof, to receive pipe thereon to be directed therefrom, (e) a pair of upright, innermost kicker bars operatively associated with said frame in guided relation, (1) said innermost kicker bars being spaced apart within the length of said trackway, and each having at least a portion thereof lying between vertical planes which are co-extensive with the outer confines of said trackway, (2) each said innermost, upright kicker bar having an angulated face near the upper end thereof, each of which faces slopes downwardly and outwardly, (3) a first air actuated cylinder mounted on said elongated frame and being operatively associated with said pair of innermost, upright kicker bars,
(i) said first air actuated cylinder being adapted to synchronously move said pair of innermost, upright kicker bars to an extended upright position above said trackway to deliver impact blows on a pipe to move the pipe transversely from said wheeled carrier outwardly onto said pipe support bars, when said air actuated cylinder is in one position,
(ii) said first air actuated cylinder being adapted to synchronously move said pair of innermost, upright kicker bars to a retracted position below said trackway when the air cylinder is in another position, (f) a pair of upright, outermost kicker bars operatively associated with said frame and being spaced apart longitudinally thereof, (1) said pair of upright, outermost kicker bars having at least one kicker bar positioned within the length of each pipe support bar and being associated therewith in guided relation, (2) each said outermost, upright kicker bar having at least one angulated face near the upper end thereof, with at least one face of each bar sloping downwardly and inwardly, (3) a second air actuated cylinder mounted on said on said elongated frame and being operatively associated with said pair of outermost, upright kicker bars,
(i) said second air actuated cylinder being adapted to synchronously move said pair outermost, upright kicker bars to an extended, upright position above said pipe support bars to deliver impact blows on a a pipe to move the pipe on said pipe support bars inwardly toward said wheeled carrier when said second air actuated cylinder is in one position,
(ii) said second air actuated cylinder being adapted to synchronously move said pair of outermost, upright kicker bars to a retracted position below a horizontal plane co-extensive with the upper surface of said pipe support bars, when said second air actuated cylinder is in another position, (g) a source of air under pressure, (h) air supply conduits connected to said source of air under pressure and to said first and second air actuated cylinders, and
   (1) control valves within said air supply conduits to selectively direct air into, and to selectively direct air out of the respective air actuated cylinders to selectively actuate said respective pairs of upright kicker bars to selectively move pipe independently along said pipe support bars toward said wheeled carrier, and to selectively move pipe off of said wheeled carrier and outwardly onto said pipe support bars toward the distal end thereof.

8. A pipe positioning device as defined in claim 3; wherein
   (a) said actuator means for said respective pairs of longitudinally spaced apart, upright kicker bars being fluid actuated cylinders.

9. A pipe positioning device as defined in claim 3; wherein
   (a) the source of power for said wheeled carriage is a fluid actuated cylinder.

10. A pipe positioning device as defined in claim 5; wherein
   (a) air conduits lead to the respective cylinders which operate said pairs of kicker bars,
      (1) valve means associated with said air conduits, said air pressure may be exterted on said cylinders to selectively retract pairs of said kicker bars below the surface of said support bars, and
      (2) said valve means associated with said air conduits adapted to selectively direct air into said respective cylinders to cause said cylinders to project pairs of kicker bars above the surface of said support bars.

References Cited by the Examiner

UNITED STATES PATENTS

| | | |
|---|---|---|
| 2,043,556 | 6/1936 | Protin. |
| 3,232,449 | 1/1966 | Quin Shen ___________ 214—1 |

FOREIGN PATENTS

| | | |
|---|---|---|
| 692,593 | 8/1964 | Canada. |
| 731,945 | 6/1955 | Great Britain. |
| 41,540 | 11/1916 | Sweden. |

MARVIN A. CHAMPION, *Primary Examiner.*